United States Patent
Kursawe et al.

(10) Patent No.: US 8,446,250 B2
(45) Date of Patent: May 21, 2013

(54) METHOD AND DEVICE FOR PROVIDING DIGITAL SECURITY

(75) Inventors: Klaus Kursawe, Eindhoven (NL); Pim T. Tuyls, Mol (BE)

(73) Assignee: Intrinsic ID B.V., Eindhoven (NL)

( * ) Notice: Subject to any disclaimer, the term of this patent is extended or adjusted under 35 U.S.C. 154(b) by 681 days.

(21) Appl. No.: 12/602,567

(22) PCT Filed: Jun. 10, 2008

(86) PCT No.: PCT/IB2008/052282
§ 371 (c)(1),
(2), (4) Date: Dec. 1, 2009

(87) PCT Pub. No.: WO2008/152577
PCT Pub. Date: Dec. 18, 2008

(65) Prior Publication Data
US 2010/0176920 A1 Jul. 15, 2010

(30) Foreign Application Priority Data
Jun. 14, 2007 (EP) ..................... 07110236

(51) Int. Cl.
*H04L 9/38* (2006.01)
(52) U.S. Cl.
USPC .............. 340/5.2; 340/5.6; 340/10.1; 726/20; 726/21; 380/263; 380/264; 380/265
(58) Field of Classification Search
USPC ............... 380/46, 44, 52, 263–265; 713/181, 713/179, 184; 726/20, 21
See application file for complete search history.

(56) References Cited

U.S. PATENT DOCUMENTS

| 6,233,339 | B1 | 5/2001 | Kawano et al. | |
|---|---|---|---|---|
| 2003/0204743 | A1* | 10/2003 | Devadas et al. | 713/200 |
| 2006/0209584 | A1* | 9/2006 | Devadas et al. | 365/52 |
| 2008/0106605 | A1* | 5/2008 | Schrijen et al. | 348/207.99 |

OTHER PUBLICATIONS

International Search Report for PCT/IB2008/052282, mailed Nov. 12, 2008.
Lim, D., "Extracting Secret Keys from Integrated Circuist", [Online], (Jul. 26, 2004), pp. 105-106 and Abstract.
Tuyls, P. et al., "RFID-Tags for Anti-counterfeiting" Topics in Cryptology, vol. 3860, (Jan. 1, 2005), pp. 115-131.
Skoric, B. et al., "Robust Key Extraction from Physical Uncloneable Functions", Lecture Notes in Computer Science, vol. 3531, (May 20, 2005), pp. 407-422.

* cited by examiner

*Primary Examiner* — Daniel Wu
*Assistant Examiner* — Frederick Ott
(74) *Attorney, Agent, or Firm* — Nixon & Vanderhye P.C.

(57) ABSTRACT

This invention relates to a method and system for providing digital security by means of a reconfigurable physical uncloneable function, RPUF. The RPUF comprises a physical system constituted by distributed components arranged to generate a first response when receiving a first challenge at a point of the physical system. The physical reconfiguring of the RPUF comprises redistributing the components such that they generate a second response, which differs from said first response, when again applying the first challenge at the point. The reconfiguration step is further utilized in providing secure storage for digital items. The digital item is data of any kind, including data that needs to be accessed and updated, i.e. which is dynamic in nature. The method is exemplified by implementations such as secure storage of a key, a secure counter and a seed generator.

25 Claims, 4 Drawing Sheets

METHOD AND DEVICE FOR PROVIDING DIGITAL SECURITY

This application is the U.S. national phase of International Application No. PCT/IB2008/052282 filed 10 Jun. 2008, which designated the U.S. and claims priority to EP Application No. 07110236.2 filed 14 Jun. 2007, the entire contents of each of which are hereby incorporated by reference.

FIELD OF THE INVENTION

The present invention relates to providing digital security, and more particularly to providing digital security by means of a reconfigurable physical uncloneable function, "PUF".

BACKGROUND OF THE INVENTION

Storing digital information in a device in a secure and tamper-proof way that is resistant to physical attack is difficult and expensive. Physical Uncloneable Functions (PUF) have been proposed as a cost-effective way of storing information in an uncloneable way. PUFs were first introduced by Pappu as a way of generating secure keys for cryptographic purposes. A PUF can be comprised of a complex physical system with many randomly distributed components. The information is contained in a cheap, randomly produced, highly complicated piece of material, and the information is read out by performing physical measurements on the PUF and performing some additional computations.

The advantage of PUFs over electronic storage lies in the following facts: 1) Since they consist of many random components, it is practically impossible to make a physical copy, 2) PUFs provide inherent tamper evidence due to their sensitivity to changes in measurement conditions, and 3) data erasure is automatic if the PUF is damaged by a probe since they will respond differently to challenges applied to them.

Since a PUF cannot be copied or modelled it is uncloneable, and hence a key which is governed by a PUF cannot be given away or be copied. This makes PUFs attractive as protective measure against attack based on copying of key material (fuel-station attack) and for Digital Rights Management (DRM) systems.

Securing Non-Volitile Memory is an important building block in the design of secure hardware, and currently there is no working solution to offer adequate protection against a high level attacker. While static memory can be secured directly by using a PUF, this is so far not possible for dynamic memory. Such memory is needed for example checksums, counters, and updatable cryptographic keys.

In the paper "Extracting Secret Keys from Integrated Circuits", by Daihyun Lim, Massachusetts Institute of Technology, May 2004, it is presented a way of improving a PUF by introducing a degree of dynamicity. In the paper Lim describes a reconfigurable PUF, which is implemented in a physical system comprising an integrated circuit. The delay characteristic of the PUF is changed by means of shifting the threshold voltage of a floating gate transistor. The shift is caused by changing the amount of charge at the floating gate. This shift changes the transistor delay, and thus the delay characteristic of the whole PUF. This prior art kind of reconfigurability relies on the procedure of storing a different value in a programmable register, where the floating gate transistor represents the register. Unfortunately, this is not as secure as desired, since an attacker may manage to read the register value or the signal which changes the value. Then the attacker will be able to reset the value to its old state. Another possible attack is to reset the value to zero by hardware means before the PUF is first used. It is desirable to improve the reconfiguration operation in order to increase the security.

SUMMARY OF THE INVENTION

It is an object of the present invention to provide a secure and tamper-resistant way of providing digital security and storing of dynamic data that alleviates the above-mentioned drawbacks of the prior art as described above.

This object is achieved by a method and a device for providing digital security by means of a reconfigurable physical uncloneable function, according to the present invention as defined in claims 1 and 20 respectively.

The invention is based on an insight that by performing a physical reconfiguration, i.e. affecting the very physical structure of the reconfigurable physical uncloneable function, a higher level of security, than that of the prior art reconfigurable physical uncloneable function, is obtained.

Thus, in accordance with a first aspect of the present invention, there is provided a method for providing digital security by means of a reconfigurable physical uncloneable function, which comprises a physical system constituted by distributed components arranged to generate a first response when receiving a predetermined challenge at a point of said physical system. The method comprises the step of physically reconfiguring the reconfigurable physical uncloneable function, which step comprises the step of redistributing the components such that they generate a second response, which differs from said first response, when applying again said first challenge at said point.

Hence, there is provided a method for a reconfigurable physically uncloneable function, "RPUF", in which the physical reconfiguration, i.e. redistribution of the components, of a PUF provides a new challenge-response behavior in a way that is independent of the challenge-response behavior of the original PUF. Such, the reconfigured RPUF implements a new, different function. This is advantageous in that an attacker who has gathered "old" challenges in some way will, after reconfiguring of the RPUF, not be able to obtain the "old" responses and hence the "old" keys anymore.

In accordance with an embodiment of the method according to the present invention, the redistribution step comprises applying an external action. The type of external action that is used for reconfiguring the reconfigurable PUF is directly corresponding to the physical constitution of the reconfigurable PUF whereby the external action may be chosen in an optimized way according to demand on reconfiguration time or size of reconfiguration area or the like.

In accordance with an embodiment of the method, the external action is at least one of external stress, pressure, laser light, radiation, particles and heat, where in a preferable way the constitution of the reconfigurable PUF will decide which at least one of the external actions to chose for the reconfiguration step.

In accordance with an embodiment of the method, the reconfiguration step is conditioned by a determination of whether the reconfiguration is to be performed or not. Thereby, different conditions for when it is time to reconfigure can easily be applied.

In accordance with an embodiment of the method, it further comprises the steps of, prior to the reconfiguration step, in at least one point on the physical system:

challenging the reconfigurable PUF with the first challenge so as to obtain the first response, and storing the response, whereby the challenge-response behavior of the PUF may be evaluated in one or more crucial points.

In accordance with an embodiment of the method, it further comprises the steps of:
  generating translation data associated with said first challenge and first response, and
  storing the translation data associated with said point.

In accordance with an embodiment of the method, it further comprises the step of:
  encoding translation data,
which is preferable when using the translation data as a key or for increasing the security of the system utilizing the method.

In accordance with an embodiment of the method, it further comprises the step of: transforming the second response to the first response by using translation data, which is an advantage when there is a need for knowing an original response from the PUF. This is the case when for instance the configuration step is unintentional or is triggered by for example applying a plurality of read operations. That is, in this case the physical components and the response-challenge of the PUF may be altered while still having the possibility to transform the challenge-response behavior to simulate the original reconfigurable PUF.

In accordance with an embodiment of the method, it further comprises the step of:
  temporarily storing the translation data.

In accordance with an embodiment of the method, it further comprises the step of:
  protectively storing the translation data.

In accordance with an embodiment of the present invention, the step of storing is done in a second reconfigurable PUF, which further enhances the security.

In accordance with an embodiment of the method, when used to provide secure storage of a digital item, the method further comprises the steps of:
  obtaining a first random key;
  generating translation data based on the first response of the first challenge in the point and the first random key;
  encrypting the item with the random key;
  storing translation data, the first challenge, and the encrypted item;
  accessing the item prior to the step of reconfiguring the reconfigurable PUF, wherein the step of accessing the item comprises the steps of:
    challenging the reconfigurable PUF with the stored challenge;
    measuring a response corresponding to the stored challenge from the reconfigurable PUF;
    reconstructing the random key using the measured response and the stored translation data;
    decrypting the stored encrypted item using the reconstructed random key, and in an alternative embodiment also temporarily storing the item, whereby said item is available for use.

Hence, in the method the reconfigurable PUF is used as a provider of secure storage for digital items. The digital item is data of any kind, even data that needs to be accessed and updated, i.e. which is dynamic in nature, which is then stored in a secure way together with the first challenge and translation data in a storage, that may be non-secured. Even though an attacker can perhaps obtain access to the encrypted item, the challenge and translation data if it is kept in a non-secure storage, he will lack access to the response data that is physically protected within the reconfigurable PUF. To extract the random key one have to have the translation data and the response from the reconfigurable PUF.

In accordance with an embodiment of the method, it further comprises the steps of, after the step of reconfiguring the PUF:
  challenging the reconfigured PUF with the first challenge;
  measuring the second response from the PUF;
  generating a second random key using the second response and the translation data;
  re-encrypting the item using the second random key;
  storing the second random key and the re-encrypted item.

After accessing and appropriate use of the digital item, its security is governed by the fact that the item is re-encrypted with a new key. Old key data gathered by an attacker is no longer valid. Hence, the updating of the digital item, which includes reconfiguring the key generator, i.e. the reconfigurable PUF, will make unapproved access to the digital item practically impossible.

In accordance with an embodiment of the method, it further comprises the steps of: generating second translation data from said first challenge and said second response, wherein said second translation data is used to generate said second random key.

In accordance with an embodiment of the method, the step of accessing the item further comprises temporarily storing said decrypted item.

In accordance with an embodiment of the method, the re-encrypted item is stored in one of a protected memory, an insecure memory, a second RPUF or a PUF.

In accordance with an embodiment of the method, the use of said item comprises updating said item, which is advantageous for using the method for providing security for counter values or other dynamic data. With this method crucial dynamic data may be stored in a non-secured storage, while still being secure.

In accordance with an embodiment of the method, the item is a key. Hence, the embodiment represents a method for secure key storage.

In accordance with an embodiment of the method, the first random key is obtained by challenging said RPUF with a second challenge.

In accordance with a second aspect of the present invention, there is provided a device for providing digital security comprising:
  a reconfigurable physically uncloneable function, which comprises a physical system constituted by distributed components arranged to generate a first response when receiving a first challenge at a point of said physical system,
  a challenge unit for challenging the RPUF;
  a detector unit for detecting said response;
  a processing unit for processing challenge and response data;
  a reconfiguration unit for physically reconfiguring said RPUF, by means of redistributing the components such that they generate a second response, which differs from the first response, when applying the first challenge at the point. Thus, if the challenge is the first challenge, that again is applied to the RPUF, the second response will still differ from the first response obtained from the original RPUF.

When implementing the RPUF in an IC or the like and utilizing the inherent random responses of the RPUF, and combine this with the ability to reconfigure the RPUF, there is offered a cheap and secure storage that can be used to authenticate dynamic information in secure hardware. The implementation of a new, different function by the RPUF enables numerous new use cases. Most prominent is the ability to secure dynamic data, such as secure counters, checksums, updatable cryptographic keys, or configuring information, or seeds for pseudorandom number generators and other security critical data.

Embodiments of the device, providing effects corresponding to those obtained by the above-mentioned embodiments of the method are provided.

These and other aspects, features, and advantages of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
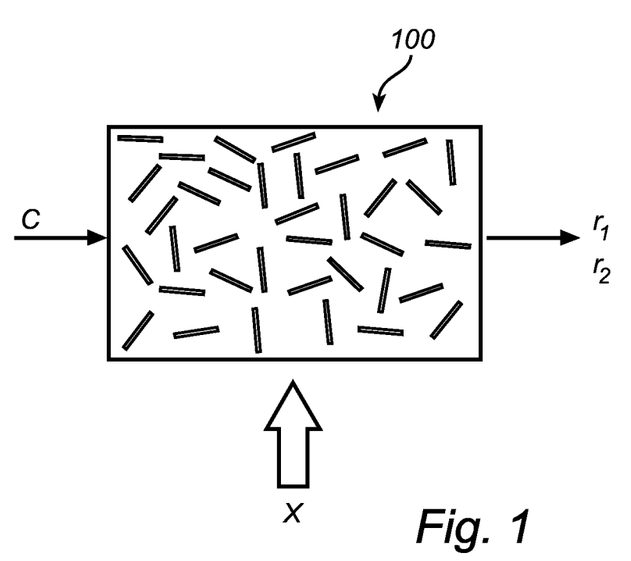
FIG. 1 illustrates a schematic drawing of a reconfigurable physically uncloneable function according to the present invention.

The concept of a reconfigurable physically uncloneable function (PUF), is illustrated in the schematic drawing as shown in FIG. 1. A reconfigurable PUF (100), which is hereinafter referred to as an RPUF, is constituted by physical components such as molecules or polymeric chains that are uniquely distributed for the individual RPUF. Evaluation of an RPUF is done by subjecting the RPUF to one or more challenges, i.e. electrical signals that are applied to the PUF. The response of an RPUF to a certain challenge is, due to the complex physics governing the interaction between the RPUF and the challenge, random looking Hence, when applying a challenge c to the RPUF (100) at a specific point on the RPUF a first response $r_1$ can be measured. Then an external action, X in FIG. 1, is applied such that the components of the RPUF are redistributed or reconfigured. Then, when applying the same challenge c, at the same specific point, a second response $r_2$ is measured.

Figure 2:
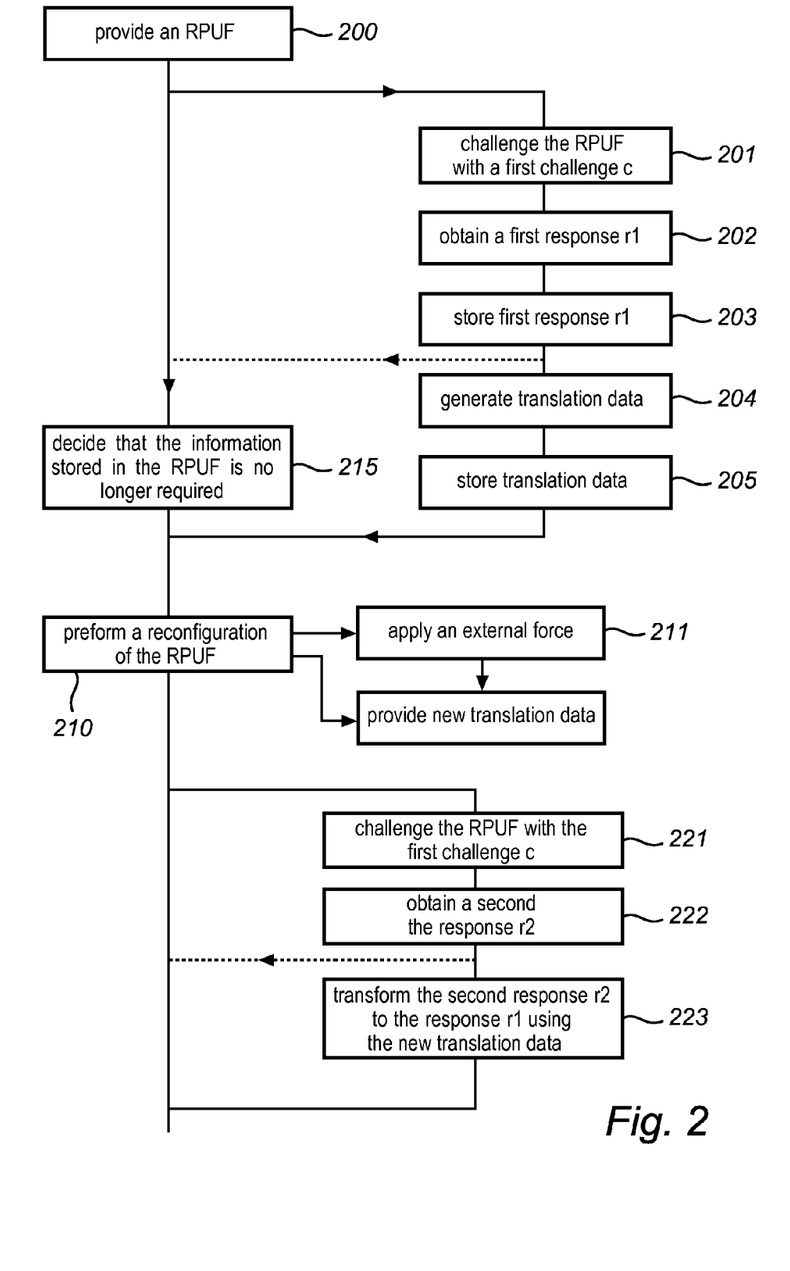
FIG. 2 is a flowchart according to an embodiment of the present invention.

In FIG. 2 a flow chart for an embodiment of the method for providing digital security is shown. The method according to the present invention is started at step 200, wherein an RPUF 100 as described in FIG. 1 is provided. The RPUF is at this point preferably configured to be utilized as storage of some information, like for instance a key which may be used for encrypting. If it is decided, at step 215, that the information stored in the RPUF is no longer required the method continues to step 210, wherein a reconfiguration of the RPUF is performed, in which the components of the RPUF is redistributed in such way that it no longer have the same challenge-response behavior as the original RPUF.

In an embodiment of the method step 210 comprises the step of applying an external force, step 211, and depending on the specific embodiment, i.e. how the RPUF is constituted, the external force may be at least one of external stress, pressure, laser light, radiation, particles and heat.

In an alternative embodiment the method further comprises steps for providing translation data. This is a sort of helper data which is described for prior-art PUF-application. Helper data, or side information, is data associated to a challenge and response, which is typically stored together with the challenge and response pair to help and is normally provided, in prior-art PUF-applications, to improve response reliability of the PUF. However, according to the present invention translation data is used in different ways which should not be confused with ordinary helper data.

In an embodiment according to the invention the translation data is used to translate a response from a certain challenge received in a reconfigured RPUF to the expected response to the same challenge as received from the original RPUF before reconfiguration.

In an alternative embodiment the translation data is further used for calculating new translation data. That is, in this embodiment, after reconfiguring of the RPUF, the new response from the RPUF is translated into a translated response as expected from the original RPUF, not to the original response itself. Thus, the new translation data must contain the original translation data.

Step 200, as described above, is here followed by step 201. In this embodiment the RPUF is evaluated in one or more crucial points. For a complete evaluation all points should be evaluated, but that is not very practical and not necessary in most cases. At step 201 the RPUF is challenged with a first challenge c at a point p, i.e. a challenge signal is feed into point p on the RPUF. At step 202 the response r1 to the challenge c is obtained by measuring the response signal according to some prior art technique. The response r1 is stored at step 203. Continuing to step 204 the method comprises generating translation data w for point p which translation data w is based on the first challenge c and the response r1. This data is then stored at step 205. The storing at steps 203 and 205 is preferably done in a temporary (protected) memory. Steps 201 to 205 are performed for all crucial points of the RPUF. After evaluation of the RPUF, the procedure continues to step 210, wherein the RPUF is reconfigured. The reconfiguring is described in more detail in the section covering the description of the device according to the present invention.

In an alternative embodiment the translation data which is generated at step 204 is encoded according to known manner prior to storing.

In another embodiment of the method according to the present invention, the reconfiguring step 210 is followed by step 221. The reconfigured RPUF is now challenged in the same points as the original RPUF. Thus, at step 221, the RPUF is challenged with the first challenge c at least in point p followed by the step of measuring the response r2 at step 222. At the next step, step 223, the second response r2 is transformed to the response equal to r1 from the original RPUF using the stored translation data w. That is, the evaluation of the RPUF prior to the reconfiguration and storing the translation data associated to a certain point and challenge helps transforming a response produced by the reconfigured RPUF to a response equal to that produced by the original RPUF. This is done by having the RPUF store an XOR mask in an insecure NVRAM. The RPUF is challenged to give a response and the response is then XORed together with the mask. Knowing the mask does not give an attacker any advantage if the corresponding response is not known, so there is no need for secure storage of the mask. To generate the new translation data, the difference between the new and original RPUF response (i.e. the XOR between them) is calculated. The difference is then XORed with the old translation data, resulting in new translation data, which will translate the new response from the RPUF into what the original response from the RPUF was translated into.

In another embodiment according to the present invention translation data w, challenge c is stored using a second reconfigurable RPUF to increase the security, when not having to store the data in a non-secured memory.

Figure 3:
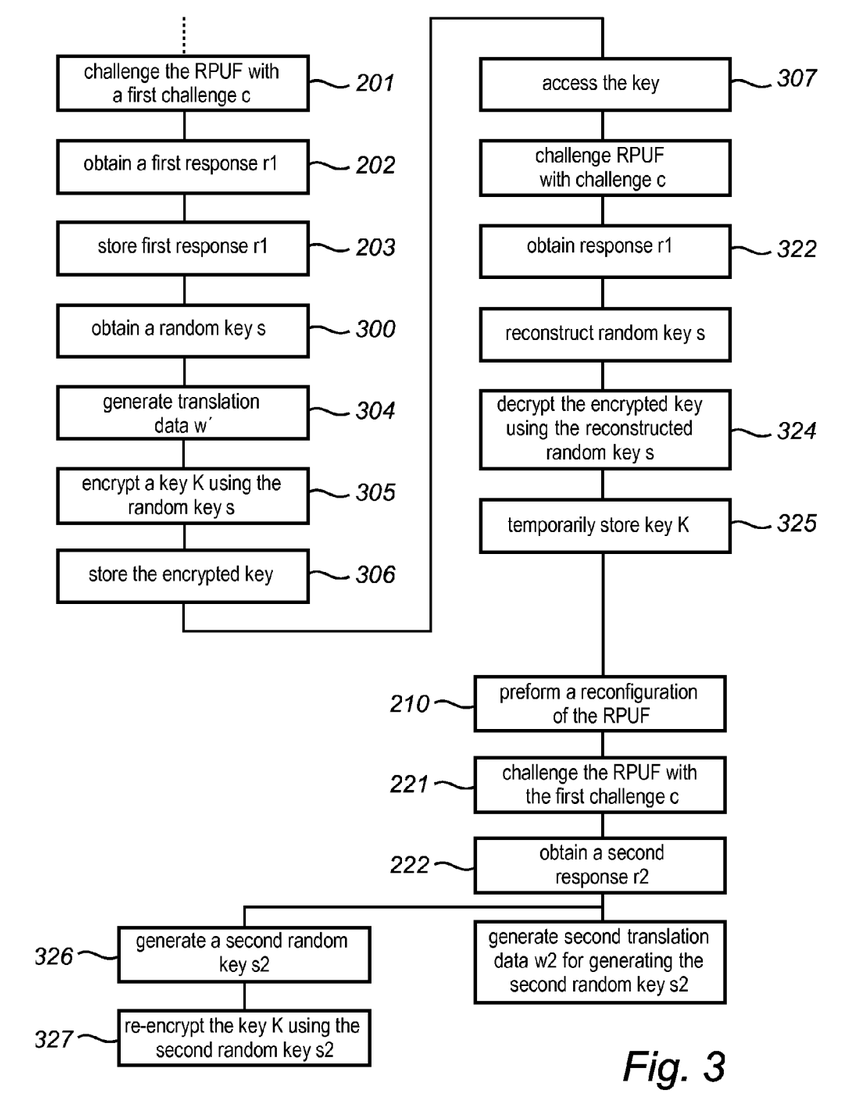
FIG. 3 is a flowchart according to an embodiment of the method for providing digital security when used to provide secure storage of data.

According to an embodiment of the method for providing digital security, the aim of the method is to provide secure storage of a key K, see FIG. 3. Here the RPUF is first challenged with a first challenge c in step 201. Next a first response r1 is obtained and stored (temporarily), steps 202 and 203. Thereafter a random key s is obtained at step 300. This can be done by challenging the RPUF with a challenge at a point and using the response as a key or can be externally provided. Translation data w' is then generated at step 304 on basis of the first response r1 and the random key s. At step 305 the key K that is to be stored is encrypted using the random key s. The encrypted key Es(K) is then stored, at step 306, together with translation data w' and the challenge c in a storage, that in this embodiment is non-secured. When accessing the key, at step 307, the RPUF is challenged with the challenge c which is retrieved from the storage, and this step is followed by step 322, where the response r1 is measured. The random key s is now reconstructed using said measured response r1 and the translation data w' which is retrieved from the storage. Finally, the encrypted key Es(K) is retrieved from the storage and decrypted at step 324 using the reconstructed random key s. The key K is now temporarily stored and available for use, step 325. To make it hard for an attacker the key K is re-encrypted after use. This takes place after the reconfiguring step 210 and the steps 221 and 222 that follows after reconfiguring the RPUF as described above. At step 326, a second random key s2 is generated using the second response r2 as obtained in step 222, which second random key s2 is used to re-encrypt the key K, Es2(K) at step 327. The second random key s2 and said re-encrypted key Es2(K) are now stored in the storage (which may be a non-secured storage).

In an alternative embodiment the second translation data w2 is generated using the retrieved challenge c and the second response r2, which w2 is then used to generate the second random key s2.

Figure 4:
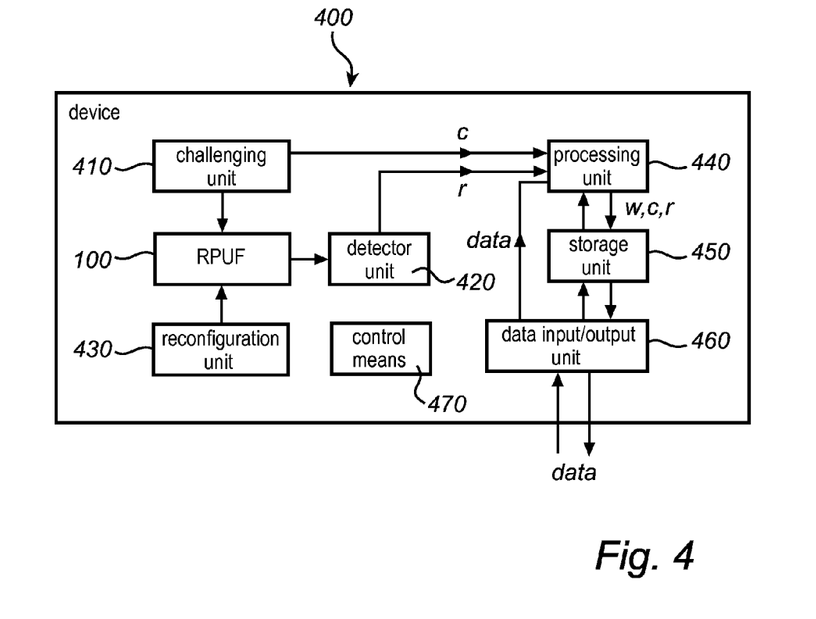
FIG. 4 illustrates an embodiment of the device for providing digital security according to the present invention.

FIG. 4 illustrates an embodiment of the device 400 for providing digital security according to the present invention. The device comprises an RPUF 100, which is preferably integrated in an IC to provide a secure digital storage.

Furthermore, the device 400 comprises a challenging unit 410 for providing challenges to the RPUF 100, which challenging unit 410 here is implemented with a signal generator 410, a detector unit 420, which is arranged to measure responses from the RPUF 100. Output signals from the challenging unit 410 and detector unit 420 are connected to a processing unit 440, which is arranged to receive the challenge data and response data and to process these data according to the methods described above and to the specific applications, which will be further discussed below. The functions performed by the units in the device 400 may be combined in one processor or may be further divided among plural processors such as digital signal processors and/or performed by dedicated hardware such as application specific integrated circuits ASIC, e.g. hardwired electronic or logic circuits or programmable logic devices, or other hardware or software implementations.

Further, the device 400 comprises a storage unit 450, which here is implemented with an EEPROM, but in alternative embodiments the storage unit is implemented with a RPUF or a PUF or any suitable prior art memory device. Hence, the storage unit can optionally be chosen to be protected or for less expensive realizations be chosen to consist of ordinary insecure memory variants.

The device contains a reconfiguration unit 430. The reconfiguration unit is designed to provide the external action that will reconfigure the employed RPUF 100. The device 400 is furthermore provided with a control means 470, which controls the units that are contained within the device 400.

A data input/output unit 460 is arranged in the device 400 for data input from an external source and for outputting data to the external source.

In an embodiment of the device according to the present invention the RPUF 100 is implemented by using a normal optical PUF which consists of a transparent material containing randomly distributed light scattering particles, which particles will constitute the distributed components of the RPUF. In an alternative embodiment the optical PUF is further provided with a reflective layer around it.

In embodiments where the RPUF 100 is realized with a normal optical PUF the reconfiguration unit 430 is provided with a heating element to apply heat to the RPUF 100, which will lead to a redistribution of the light scattering particles. In an alternative embodiment the heat is applied with a radiant source, e.g. an IR-lamp or an infrared laser. In an alternative embodiment the reconfiguration unit 430 is provided with means for mechanically applying stress to the RPUF 100, which will lead to the redistribution of the light scattering particles of the optical PUF 100.

When using a normal optical PUF as the RPUF 100, the challenge applied to the RPUF 100 and the measured response from the RPUF 100 are obtained by providing the challenge unit 410 with a laser source to expose the RPUF 100 to an incident laser beam and arrange the detector unit 420 to measure the corresponding light response, i.e. a speckled light pattern, from the RPUF 100.

In an embodiment of the device according to the present invention the RPUF 100 is realized by using a degrading PUF, such as an optical PUF made of plastic or some polymer that changes its properties with time when influenced by for instance reading operations on the RPUF 100. When applying laser light to the plastic material for too long time, the plastic deforms and the distribution of the light scattering particles is unintentionally changed, even when no reconfiguration is intended for the RPUF 100. When using a degrading PUF the device operates in accordance with the method using translation data for translating new responses to old ones that has already been described above.

In an alternative embodiment of the device according to the present invention, the RPUF is realized as a coating containing many randomly distributed particles with different dielectric constants. Responses are obtained by means of capacitance measurements of the coating. This RPUF is reconfigured by redistributing the particles by means of mechanical stress or heat.

In an embodiment of the device according to the present invention another type of RPUF is used, wherein the distributed components of the RPUF is realized by means of quantum bits, qubits. The RPUF is realized as follows. A qubit has the property that it has two bases (usually called the X and the Z basis) and in each basis there are two perfectly distinguishable states, usually referred to as the up and the down states. So the qubit can be configured in a basis (X or Z) and in each basis in a state, up or down. To each of the states a classical bit is connected e.g.: up: 1 and down: 0.

Assume that a qubit is configured in the up state in X basis. If the qubit is measured in the X basis, the measurement returns the up-state and hence the bit value 1; however when it is measured in the Z basis, the complementary basis of the one in which it was configured, the measurement returns 0 or 1 both with a probability of 50%. This is a consequence of the fact that the state of the qubit has collapsed at random into the up and the down state in the Z basis. In order to be able to use qubits for storing information, the challenges, i.e. the announcement of the basis in which they have to be measured, has to be stored in the memory 450 in the device 400.

Thus, measuring the RPUF 100 in the complementary basis will cause the qubits to be redistributed unpredictably in the new basis in the up or down state, and hence the RPUF is reconfigured. The new challenge consisting of the new bases in which the qubits have to be measured replace the old challenge.

In the following, the intention of the device is to store a key K securely in the storage unit 450 of the device 400. The key K is supplied via the data input/output unit 460. The RPUF 100 is used as follows. During enrolment the challenge unit 410 applies a challenge c to the RPUF 100 and its response r is measured by the detector unit 420. Then a random key s is chosen, which is provided from the data input/output unit 460 or in alternative embodiments is retrieved from the storage unit 450 or obtained from the RPUF by applying an arbitrary challenge and receiving a response that is used as s, and translation data w is generated by the processing unit 440. Next the key K is encrypted in the processing unit 440 with the string: Es(K). This encryption can be simply a one-time pas encryption. Finally, the translation data w, the challenge c and Es(K) are stored in the storage unit 450 of the IC, which is realized with an EEPROM. Since this storage unit 450 is not secured, an attacker has access to all data stored in the EEPROM.

In order to access the key K the following steps are performed.

The challenging means 410 challenges the RPUF with the challenge c and the detector unit 420 measures its response r'. The processing unit 440 retrieves the translation data from the EEPROM 450 and reconstructs s from r' and w using a translation data algorithm (Fuzzy Extractor). The processing unit 440 retrieves Es(K) from the EEPROM 450. Using s, the processor unit 440 decrypts Es(K) into K and puts it for a time as short as possible into some Volatile Memory (e.g. RAM) (not shown). The processing unit 440 starts performing the necessary security operations like for instance cryptographic operations with the key K. The reconfiguration unit 430 is instructed by the control means to reconfigure the RPUF 100, using the appropriate method which depends on the specific implementation of the RPUFs described above.

Next, using the challenge c the challenge unit 410 applies a challenge to the reconfigured RPUF and a new response r1 is measured by means of the detection unit 420. The processor unit 440 then applies the translation data w to generate a new key s1. The key K is re-encrypted with the key s1 and Es1(K) is stored in EEPROM 450. The key K is removed from volatile memory (not shown) as soon as possible, i.e. from that point in time on when it is not needed anymore.

In an alternative embodiment new translation data w1 can be generated in by the processing unit 440 to construct a new key s1.

In an alternative embodiment the RPUF 100 consists of two individual physical systems RPUF1 and RPUF2. The functionalities of the device according to the present invention are then carried out using RPUF1 and RPUF2. Then, the keys s, s1, . . . to encrypt the key K, are first integrated by RPUF 1, the next by RPUF2, the next by RPUF 1. This has the advantage that in order to re-encrypt the key K, K does not have to be put in a volatile memory outside the PUFs anymore, which is clearly more secure. This is especially advantageous if the operation gets interrupted, e.g. due to loss of electrical power, since no key or data is revealed, and the operation can easily be continued again. See table 1. in which using only one RPUF and using two RPUFs is compared. Also note that the old key s, with which the key K was encrypted does not exist anymore and can not be constructed anymore since the PUF has been reconfigured.

TABLE 1

A table to compare the steps for providing keys and reconfiguring of the RPUF for a device or method for securely storing data according to the present invention when using one RPUF, and two RPUFs respectively.

| Using one RPUF | Using two RPUFs, RPUF1 and RPUF2 |
|---|---|
| Read key from the RPUF | Reconfigure RPUF2 |
| Store key in RAM | Read key from RPUF1 |
| Reconfigure RPUF | Decrypt data with key read from RPUF1 |
| Decrypt data with key from RAM | Encrypt data with key read from RPUF2 |
| Encrypt data with new key read from the reconfigured RPUF | Reconfigure RPUF1 |

In an embodiment the device 400 according to the present invention is used to provide a secure counter. A counter value is first encrypted using a key derived from the RPUF 100 according to the method as described above (step 300), and is then stored in the storage unit 450. When the counter is incremented/decremented the following functions are performed in the device 400:

The processing unit 440
  retrieves the encrypted counter value and challenge c from the insecure storage, EEPROM 450,
  decrypts the encrypted counter value using the RPUF key which is obtained by challenging the RPUF with c.
The reconfiguration unit 430 reconfigures the RPUF 100.
The counter value is incremented/decremented and encrypted under a new RPUF key.
The new encrypted counter value is stored into the insecure storage, EEPROM 450.

As RPUF keys to decrypt old counter values never exists outside the RPUF, and are automatically destroyed when the RPUF is reconfigured, any replay attack on the counter will fail. Any dynamic data, e.g. configuration data, hash values of critical data, and updatable keys may be secured in a similar fashion as in the described embodiments above.

A special use case of the present invention is the implementation of the TCG standard, where cheap secure hardware needs to provide all of the above units of the device 400. Especially the use of secure NVRAM is a critical issue, as it is the component that drives the prices of the hardware and a major security issue.

In an alternative embodiment, by using 2 PUFs for performing the functionalities of the device 400, it is possible to secure an arbitrary amount of memory.

In an alternative embodiment the device is used as a seed generator for a pseudorandom number generator by, after reconfiguration is done by the reconfiguration unit 430, applying a challenge to the RPUF 100 and detecting the response with the detection unit 420. Next the response is used as the seed (alternatively after performing some signal processing on the response in the processing unit). Hence the fact that the response from the RPUF after a reconfiguration is statistically random is utilized.

Above, embodiments of the method and device for providing digital security according to the present invention as defined in the appended claims have been described. These should be seen as merely non-limiting examples. As understood by a skilled person, many modifications and alternative embodiments are possible within the scope of the invention.

It is to be noted, that for the purposes of this application, and in particular with regard to the appended claims, the word "comprising" does not exclude other elements or steps, that the word "a" or "an", does not exclude a plurality, which per se will be apparent to a person skilled in the art.

The invention claimed is:

1. A method for providing digital security by means of a reconfigurable physical uncloneable function, which comprises a physical system constituted by distributed components arranged to generate a first response when receiving a first challenge at a point on said physical system, the method comprising:
   providing a reconfiguration unit designed to provide an external action that will physically reconfigure the reconfigurable physical uncloneable function, the physical reconfiguration of the reconfigurable physical uncloneable function providing a new challenge-response behavior that is independent of the challenge-response behavior before said reconfiguration, and
   physically reconfiguring said reconfigurable physical uncloneable function, which comprises redistributing said components using the reconfiguration unit such that they generate a second response, which differs from said first response, when again applying said first challenge at said point, the physical reconfiguration affecting the physical structure of the reconfigurable physical uncloneable function.

2. A method according to claim 1, wherein said redistribution step comprises applying an external action.

3. A method according to claim 2, wherein said external action is at least one of external stress, pressure, laser light, radiation, particles and heat.

4. A method according to claim 1, wherein said reconfiguring step is conditioned by a step of determining whether or not to perform a reconfiguration.

5. A method according to claim 1, further comprising the steps of, prior to said reconfiguration step, in at least one point on the physical system:
   challenging the reconfigurable physical uncloneable function with said first challenge so as to obtain said first response; and
   storing said response.

6. A method according to claim 5, further comprising the steps of:
   generating translation data associated with said first challenge and first response; and
   storing said translation data associated with said point.

7. A method according to claim 6, further comprising the step of encoding said translation data.

8. A method according to claim 6, further comprising the step of transforming said second response to said first response by using said translation data.

9. A method according to claim 6, further comprising the step of temporarily storing said translation data.

10. A method according to claim 6, further comprising the step of protectively storing said translation data.

11. A method according to claim 10, wherein said steps of storing is done in a second reconfigurable physical uncloneable function.

12. A method according to claim 4, wherein said providing digital security being constituted by providing secure storage of a digital item, the method further comprising the steps of:
   obtaining a first random key;
   generating translation data based on said first response of said first challenge in said point and said first random key;
   encrypting said item with said random key;
   storing translation data, said first challenge, and said encrypted item;
   accessing said item prior to the step of reconfiguring the reconfigurable physical uncloneable function, wherein the step of accessing the item comprises the steps of:
      challenging the reconfigurable physical uncloneable function with said stored challenge;
      measuring a response corresponding to the stored challenge from the reconfigurable physical uncloneable function;
      reconstructing said random key using said measured response and said stored translation data;
      decrypting said stored encrypted item using said reconstructed random key, whereby said item is available for use.

13. A method according to claim 12, wherein the step of assessing said item further comprises temporarily storing said decrypted item.

14. A method according to claim 12, further comprising the steps of, after the step of reconfiguring said reconfigurable physical uncloneable function:
   challenging the reconfigured reconfigurable physical uncloneable function with said first challenge;
   measuring said second response from the reconfigurable physical uncloneable function;
   generating a second random key using said second response and said translation data;
   re-encrypting said item using said second random key;
   storing said second random key and said re-encrypted item.

15. A method according to claim 14, further comprising generating second translation data from said first challenge and said second response, wherein said second translation data is used to generate said second random key.

16. A method according to claim 15, wherein said re-encrypted item is stored in one of a protected memory, an insecure memory, a second reconfigurable physical uncloneable function, and a physical uncloneable function.

17. A method according to claim 12, wherein the use of said item comprises updating said item.

18. A method according to claim 12, wherein said item is a key.

19. A method according to claim 12, wherein said first random key is obtained by challenging said reconfigurable physical uncloneable function with a second challenge.

20. A device for providing digital security comprising:
   a reconfigurable physically uncloneable function, which comprises a physical system constituted by distributed components arranged to generate a first response when receiving a first challenge on a point of said physical system,
   a challenge unit for challenging said reconfigurable physical uncloneable function;
   a detector unit for detecting said response;
   a processing unit for processing challenge and response data;
   a reconfiguration unit for physically reconfiguring said reconfigurable physical uncloneable function, the physical reconfiguration of the reconfigurable physical uncloneable function providing a new challenge-response behavior that is independent of the challenge-response behavior before said reconfiguration, the reconfiguration unit reconfiguring by means of redistributing said components such that said components generate a second response, which differs from said first response, when again applying said first challenge at said point, the physical reconfiguration affecting the physical structure of the reconfigurable physical uncloneable function.

21. A device according to claim 20, further comprising a storage unit for storing at least challenge and response data, wherein said storage unit is implemented with one of a protected memory, an insecure memory, a second reconfigurable physical uncloneable function, and a physical uncloneable function.

22. A device according to any of claim 20, wherein the reconfigurable physical uncloneable function is implemented by an optical material and said reconfiguration unit is arranged to apply an external stress to the physical system.

23. A device according to claim 20, wherein the reconfigurable physical uncloneable function is implemented by an optical material and the reconfiguration unit is arranged to apply heat to the physical system.

24. A device according to claim 20, wherein the reconfigurable physical uncloneable function is implemented by a degrading optical material and wherein said reconfiguration unit is arranged to apply a large number of reading operations.

25. A device according to claim 20, wherein the components of the reconfigurable physical uncloneable function are based on a string of quantum bits which are configured in a first basis, and the reconfiguring unit is arranged to apply an external measurement on the quantum bits in a second basis that is different from said first basis causing said quantum bits to redistribute randomly to configure into said second basis, whereby said reconfigurable physical uncloneable function is reconfigured.

* * * * *